Nov. 5, 1929.  L. W. WEBB ET AL  1,734,931
INTERNAL COMBUSTION ELECTRIC DRIVE
Filed March 23, 1926
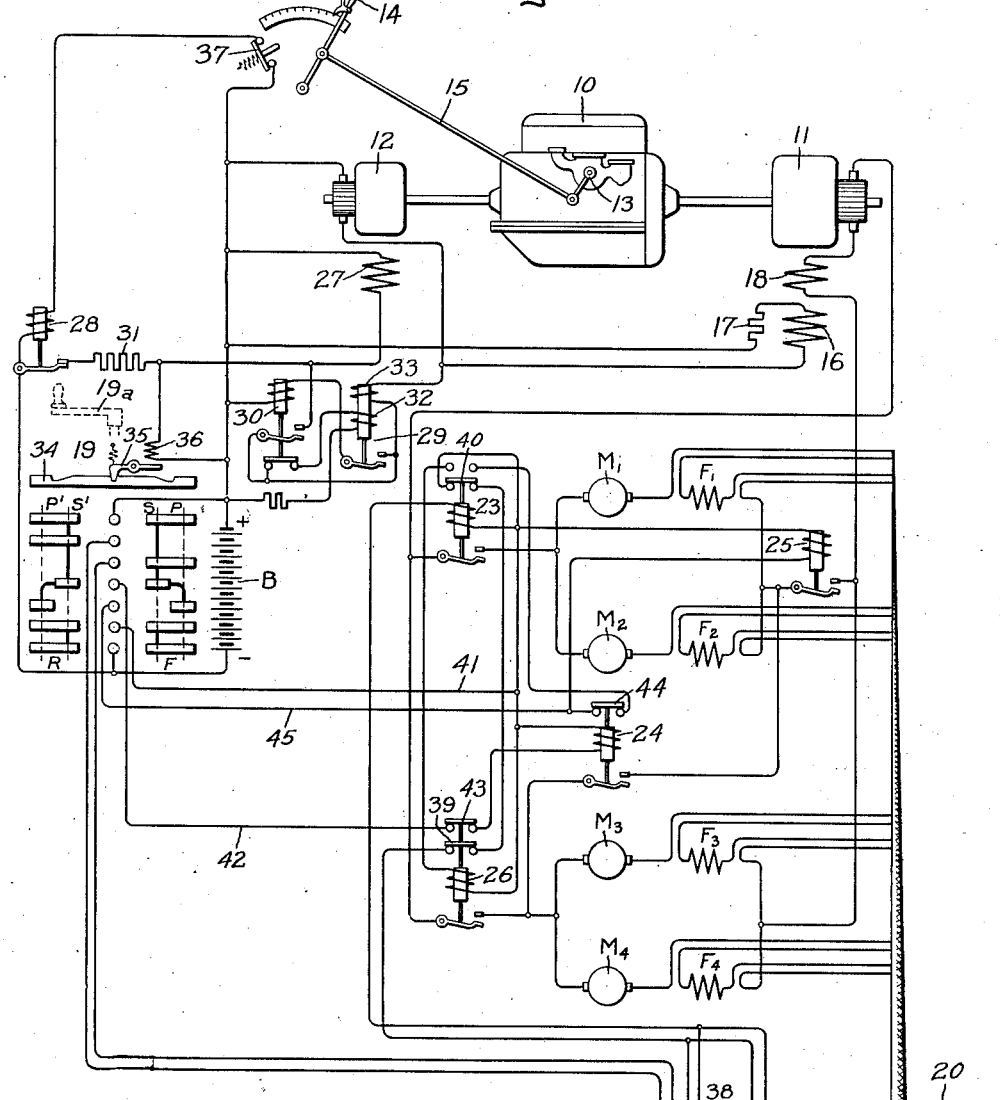
Inventor:
Lewis W. Webb,
Bernard Woodward
by
Their Attorney, Patented Nov. 5, 1929

1,734,931

UNITED STATES PATENT OFFICE

LEWIS W. WEBB AND BERNARD WOODWARD, OF SCHENECTADY, NEW YORK, ASSIGNORS TO GENERAL ELECTRIC COMPANY, A CORPORATION OF NEW YORK

INTERNAL-COMBUSTION ELECTRIC DRIVE

Application filed March 23, 1926. Serial No. 96,834.

Our invention relates to variable speed drives for motor cars, locomotives, ships, or the like, wherein a gas, oil, or other type of internal combustion engine is arranged to drive an electric generator from which a plurality of motors for driving the load are energized. The invention relates more particularly to internal combustion electric drives of the above character in which the driving speed is varied by interconnecting the several driving motors in various speed relations such as series and series parallel, as well as by varying the operating speed of the internal combustion engine.

The improvements provided by the present invention insure that the variations in the engine speed and the interconnection of the driving motors in the several speed relations are properly synchronized so as to avoid abrupt or sudden variations in the driving speed and also that the transitions of the motor connections between the several speed relations are made only when the current from the generator is cut off or of negligible value. In this way, our invention prevents a careless or impetuous operator from imposing harmful shocks upon the driving equipment by sudden variations in the driving speed, and also preserves the motor controlling switch mechanism from injurious arcing or burning of the controlling contacts.

In the accompanying drawing, Fig. 1 is a schematic diagram of an internal combustion electric drive embodying a preferred form of the invention that is particularly suitable for motor car or locomotive service, and Fig. 2 shows a modification of a portion of the controlling apparatus and circuits employed in Fig. 1.

In the arrangement shown in Fig. 1, the gas engine 10 is mechanically coupled to drive the electric generator 11 and also the separate exciter 12. The operating speed of the gas engine 10 is varied upon operation of the throttle valve 13 by means of the engine speed controlling handle 14 which is connected to operate the throttling valve 13 by means of the rod 15 or in any suitable manner. It will be understood that when other types of internal combustion engines, such as oil engines or the like, are employed to drive the generator 11, the engine speed controller 14 is arranged to control the particular type of speed regulating device with which the engine may be equipped.

The generator 11 has a main field winding 16 connected to be separately energized from the exciter 12, with the regulating resistor 17 in the circuit, and also is provided with a differential series field winding 18, in order to stabilize the generating characteristics under varying load conditions. The generator 11 supplies power to the several driving motors $M_1$ to $M_4$, having the series field windings $F_1$ to $F_4$, respectively. It will be understood that the driving motors are suitably geared to the driving wheels of a motor car or locomotive. The several driving motors are interconnected to operate in either series or parallel groups in both the forward and reverse direction under the control of the drum controller 19, arranged to be actuated by the operator and the electromagnetically operated reversing switch mechanism 20. As shown, the drum controller 19 is provided with a manual operating handle $19^a$, although suitable pedal operated mechanism may be employed if desired.

The drum controller 19 is shown in the off position, and is operated in one direction to energize the operating electromagnet 21 of the reverser 20 to suitably connect the series field windings $F_1$ to $F_4$ of the corresponding motors $M_1$ to $M_4$ in the proper relation for forward operation of the motors, and in the other direction for energizing the operating electromagnet 22 of the reverser 20 to establish the proper field connections for reverse operation of the motors. The drum controller 19 also controls the electromagnetic contactors 23, 24, to interconnect the pair of motors $M_1$, $M_2$ in series relation with the pair of motors $M_3$, $M_4$ in the positions S and S' indicated in the drawing for low driving speeds. In positions P and P' the contactors 23, 25, 26 are operated to establish full parallel connections between the motors for the higher driving speeds.

It will be observed that the exciter 12 is provided with a main field winding 27 which is energized from the storage battery B when the electroresponsive switch 28 is closed. The switch 28 in conjunction with the cooperating undercurrent relay 29 and charging switch 30 also establishes connections through which the battery B is recharged from the exciter 12 through the regulating resistor 31, in shunt circuit with the main field winding 16 of generator 11. The closure of the relays 29 and 30 also connects the field winding 27 of the exciter 12 in shunt with the generator field winding 16, and the characteristics of exciter 12 and the regulating resistor 31 are such that the field windings 16 and 27 are energized at considerably higher voltage than that of battery B when the engine 10 is operating at high speed. Under these conditions the resistor 31 limits the value of the charging current supplied from the exciter 12 to battery B. The undercurrent relay 29 controls the closure of charging switch 30 and is adjusted so that its contact when closed by the shunt winding 32 in response to a predetermined voltage across the exciter armature is maintained in the closed position by the series winding 33 so long as a charging current of predetermined value is supplied to the battery B. Thus, whenever the battery charging circuit is interrupted by the opening of the switch 28 the series winding 33 of relay 29 is de-energized and the relay opens the energizing circuit of charging switch 30 to permit the latter to open.

In order to prevent operation of the drum controller 19 between its various operative positions when the generator 11 is excited, an electroresponsive latch mechanism is provided for mechanically locking the drum controller 19 in the off position in which it is shown, and also for preventing transitions from either of the series positions S and S' into the corresponding parallel positions P and P'. The latch mechanism as shown diagrammatically in the drawing comprises the notched rack 34 and the cooperating latch 35 which is normally biased out of engagement with the notched rack 34 and is operated into engagement therewith upon energization of the operating winding 36. The latch operating winding 36 is connected to be energized in parallel circuit with the exciter field winding 27 under the control of the auxiliary switch 37, which is associated with the engine speed controller 14.

As will be pointed out more fully in connection with the operation of our invention, the arrangement is such that the latch operating winding 36 is deenergized only when the engine controller 14 is in the idling or low speed position and the generator field winding 16 and the exciter field winding 27 are deenergized. This latching arrangement effectively prevents operation of the drum controller 19 to either establish connections between the generator 11 and the driving motors $M_1$ to $M_4$, or to shift the motors from the low speed operating relation to the high speed relation when the generator is excited, thus preventing an operator from establishing driving connections or shifting the motors into the high speed relation when the generator 11 is excited and driven by the engine 10 at full speed or any other value of speed above the idling speed.

The operation of our internal combustion electric drive arrangement is as follows. Assuming that the drive is applied to a locomotive, the engine 10 is started either by means of a suitable electric starting motor or an air motor, not shown in the drawings, although it will be understood that if desired, the engine may be arranged to be started by operating either the generator 11 or the exciter 12 as a motor. With the engine control lever 14 in the position shown, the engine accelerates to approximately full speed. Since the auxiliary switch 37 associated with the engine controller 14 is closed, the operating winding of the electromagnetic switch 28 is energized from the battery B and the switch 28 is closed to establish an energizing circuit from the battery B to the exciter main field winding 27. As the exciter voltage builds up, the generator main field winding 16 is energized, and when the exciter voltage reaches the predetermined value required for the shunt winding 32 of the relay 29 to operate, the charging switch 30 is thereby closed to permit the exciter 12 to energize its own field winding 27 and also recharge the battery B through the regulating resistor 31. Under these conditions the voltage of generator 11 is near its maximum value, since there is no current flowing through the differential field winding 18 to neutralize the full excitation of the main field winding 16. Obviously, it is extremely undesirable to establish either the series or the parallel power connections of the motors when the generator voltage is at maximum value, as the resulting rush of current not only may cause destructive arcing at the driving motors, the contactors, or the generator 11, but also may impose a severe jolt and strain upon the engine 10 as well as the entire motor car or locomotive. Furthermore, the rush of current from the fully excited generator to the motors at the instant of changing from the series to the parallel connections may cause severe burning or pitting of the motor controlling contacts or of the generator or motor commutators. These undesirable results, however, are effectively prevented in the arrangement shown, due to the fact that the latch operating winding 36 in energized and the latch 35 is electromagnetically held in engagement with the notch in the bar 34 as indicated in the drawing to hold the drum controller 19 in the off position or prevent advancement into the parallel positions.

Hence, under the assumed conditions, before the drum controller 19 can be operated from the off position in which it is shown, to connect the driving motors $M_1$ to $M_4$ to the generator 11, for operation in either direction, the engine controlling lever 14 must be thrown to the idling or low speed position in which the auxiliary switch 37 is engaged and operated to interrupt the energizing circuit of the electromagnetic switch 28. As the engine speed controlling lever 14 is moved to the off position, the engine speed decreases and the voltage of exciter 12 decreases at an even greater rate. When the exciter voltage is decreased to or slightly below the voltage of the battery B, there is insufficient current through the winding 32 of relay 29 to maintain the relay in the closed position. Consequently, the relay opens and deenergizes the switch 30 to disconnect the exciter armature from both the battery B and the exciter field winding 27. The field winding 27, however, remains connected to the battery B until the speed controlling lever 14 engages with and opens the switch 37. This deenergizes the electromagnetic switch 28 and thereby disconnects the field winding from the battery B. Thus, the exciter field winding 27 and the operating winding 36 of the electroresponsive latch mechanism are disconnected both from the battery B and the exciter armature when the engine speed controller 14 is in the low speed position and the auxiliary switch 37 is open.

In case the speed-voltage characteristics of exciter 12 are such that the low speed voltage of the exciter is maintained at a materially greater value than the voltage of battery B, an additional electromagnetic switch 28$^a$, having its operating winding connected in multiple with the operating winding of switch 28 is arranged to positively open the circuit of the exciter field winding 27 under the control of the auxiliary switch 37, as shown in the modified arrangement of Fig. 2. However, with the exciter speed-voltage characteristics as outlined above, the switch 28$^a$ is unnecessary.

With the winding 36 deenergized, the latch 35 is released from the central notch in the rack 34, and the operation of the controller 19 from the off position is no longer restrained. If the controller 19 is operated into position S the reverser operating electromagnet 21 is energized through a circuit extending from the positive battery terminal, the upper two right-hand contacts of controller 19, the winding of operating electromagnet 21, the contacts 38, 39, 40, the conductor 41 and the two lower contacts of controller 19, to the negative battery terminal. The operating electromagnet 21 operates the reverser 20 to interconnect the motor armature and field windings in the proper relation for forward driving rotation of the motors. The energizing circuit of operating electromagnet 21 is interrupted at the lower contact 38, and the upper contact 38 completes the energizing circuit for the electromagnetic contactor 23. At the same time, the electromagnetic contactor 24 is energized through the conductors 41 and 42 and the auxiliary contact 43, with which the electromagnetic contactor 26 is provided.

Closure of contactors 23 and 24 completes the series connection of the driving motors $M_1$ to $M_4$ to the generator 11 with the generator field winding 16 unenergized. Consequently, there is no appreciable current supplied to the motors until the engine speed controller 14 is operated from the idling or low speed position. When this is done, the switch 37 closes in accordance with its bias, and reenergizes the contactor 28 to energize the exciter field winding 27 from the battery B. As the exciter voltage builds up, the generator main field winding 16 is energized, and power current is supplied by the generator to start the driving motors operating in the forward direction. Due to the characteristics of exciter 12, the excitation of the generator field winding 16 is automatically increased as the engine 10 is accelerated to full speed by operation of the engine speed controller 14. When the voltage of the exciter 12 exceeds that of battery B, the relay 29 and the charging switch 30 are closed in the manner previously described, to permit the voltage applied to the exciter field winding 27 to be increased and to supply a charging current to the battery B, through the regulating resistor 31.

Since the latch operating winding 36 is energized in parallel circuit with the exciter field winding 27, the latch 35 is firmly held in engagement with the right-hand notch in the rack 34 with the controller 19 in position S. Due to the shape of the notch, the controller 19 may be operated to the off position at any time as the latch 35 rides up the sloping side of the notch and drops into the central notch in the rack 34. However, the right-hand notch in the rack 34 is shaped so that the controller 19 cannot be advanced into position P to shift the motors into the parallel operating relation, until the operating winding 36 is deenergized.

Hence, if it is desired to obtain the high speed driving relation, the engine speed controller 14 must be returned to the idling or low speed position wherein it opens the switch 37. The opening of switch 37 serves to remove excitation from the generator 11 and interrupt the energizing circuit for the latch operating winding 36 in the manner previously described.

With the latch 35 released, the controller 19 then may be operated into position P. This interrupts the energizing circuit for contactor 24 through the conductor 42, and upon opening of the contactor the auxiliary contact 44 completes an energizing circuit for contactor 26, which may be traced from the positive battery terminal through the contacts of the controller 19, conductor 45, contact 44, contact 40 in its upper position, winding of contactor 26, and conductor 41, to the negative battery terminal. At the same time the winding of contactor 25 is energized from the battery B through the conductors 41 and 45. When the contactors 25 and 26 close, all of the motors $M_1$ to $M_4$ are connected in full parallel relation to the generator 11.

Power is applied to the driving motors in the parallel operating relation by advancing the engine speed controller 14 toward the high speed position. This permits the switch 37 to reclose and reenergize the exciter field winding 27, and thereby re-excite the generator field winding 16 in the same way as described above.

Although the latch operating winding 36 again is energized, the controller 19 may be freely operated to either the series position or the off position at any time, without restraint by the latching mechanism. In either case the driving current and torque of the motor are reduced, and, consequently, there is no possibility of imposing jolts or strains upon the driving equipment.

Operation of the controller 19 into the positions S' and P' controls the interconnection of the driving motors in the series and parallel relation in identically the same way as previously described, except that the operating electromagnet 22 is energized to operate the reverser 20 to interconnect the motor field windings and armatures for rotation in the reverse direction. The electromagnetic latch mechanism functions in the same manner as previously described to prevent operation of the controller 19 from the off position or from the series position to parallel position except when the generator 11 is unexcited.

From the foregoing, it will be observed that our invention permits complete control of the variation in operating speed of the combustion engine drive by means of the engine speed controller 14, thus producing a simple and reliable control, which at the same time is proof against improper operation by a careless operator.

While we have illustrated and described an internal combustion electric drive embodying a preferred form of the invention, it should be understood that the arrangement shown is capable of considerable modification without departing from the spirit and scope of the invention.

What we claim as new and desire to secure by Letters Patent of the United States, is:

1. In a system of the character described, the combination of an engine, controlling means for varying the operating speed of the engine, an electric generator driven by the engine, a plurality of electric driving motors, a controller for controlling the interconnection of said motors in a plurality of speed relations and the connection of the generator therewith, electroresponsive latch mechanism for preventing a predetermined operation of said controller, and switch mechanism associated with said engine speed controlling means and connected to control both the energization of the generator field and of said electroresponsive latch mechanism to prevent a predetermined operation of said controller when the generator is excited.

2. In a system of the character described, the combination of an engine, controlling means for varying the operating speed of the engine, an electric generator driven by the engine, a plurality of electric driving motors, a controller having an off position and a plurality of operative positions for controlling the interconnection of said motors in a plurality of speed relations and the connection of the generator therewith, electroresponsive latch mechanism for preventing operation of said controller from a plurality of its positions and a switch associated with said engine speed controlling means for simultaneously effecting the excitation of the generator and operation of said latch mechanism to prevent operation of said controller from each of said plurality of positions when the said engine speed controlling means is operated to increase the engine speed above a predetermined value.

3. In a system of the character described, the combination of an engine, an electric generator driven by the engine, a controlling device for varying the operating speed of the engine and having a switch operable to the circuit opening position upon operation of the controlling device to reduce the engine speed below a predetermined value and biased to the circuit closing position to effect the excitation of the generator, a plurality of electric driving motors, switch mechanism for controlling the interconnection of the generator with said motors for operation thereof in a plurality of speed relations, and electroresponsive latch mechanism connected to be energized upon closure of said switch for preventing operation of said switch mechanism when the generator is excited.

4. In a system of the character described, the combination of an engine, controlling means for varying the operating speed of the engine, an electric generator driven by the engine, switch mechanism associated with said speed controlling means for controlling the excitation of the generator, a plurality of electric driving motors, a controller having a plurality of positions for controlling the interconnection of said motors in a plurality of speed relations and the connection of the generator therewith, and electroresponsive means for preventing operation of said controller from a plurality of said positions, said electroresponsive means being connected to be rendered effective upon operation of said switch mechanism to excite the generator.

5. In a system of the character described, the combination of an engine and an electric generator driven thereby, control means operable between a low speed position and a high speed position for varying the operating speed of the engine, circuit controlling means associated with said speed control means for interrupting the excitation of the generator in the low speed position of said controlling means and for effecting the excitation of the generator upon operation of the controlling means from said low speed position, a plurality of electric driving motors, a controller for controlling the interconnection of the motors in a plurality of speed relations and the connection of the generator therewith, and electroresponsive means for preventing operation of said controller to connect the motors to the generator, said means being connected to be rendered effective under the control of said switch mechanism upon operation of said speed controlling means from said low speed position.

6. In a system of the character described, the combination of an internal combustion engine and an electric generator mechanically connected to be driven thereby, means for separately exciting the generator, a controlling device operable to a plurality of positions between a low speed position and a high speed position for varying the speed of the engine, switch mechanism associated with said controlling device for varying the excitation of the generator upon operation of the controlling device to and from said low speed position, a plurality of electric driving motors, a controller having an off position and a plurality of operative positions for controlling the interconnection of said motors with the generator for operation in a plurality of speed relations, and electroresponsive latch mechanism for preventing operation of said controller from the said off position and from certain of said operative positions to other operative positions, said electroresponsive latch mechanism being connected to be rendered effective under the control of said generator excitation control switch mechanism upon operation of said engine speed controlling device from said low speed position.

7. In a system of the character described, the combination of an internal combustion engine and an electric generator mechanically connected to be driven thereby, an exciter for the generator mechanically connected to be driven by the engine and electrically connected to excite the generator field winding, a controlling device operable to a plurality of positions between a low speed position and a high speed position for controlling the operating speed of the engine, field control switch mechanism for said exciter associated with said engine speed controlling device to be actuated upon operation of said device to the low speed position for interrupting the excitation of the exciter and to be actuated upon operation of said engine speed controlling device from the low speed position for effecting the excitation of the exciter, a plurality of electric driving motors, a controller operable from an off position to a plurality of operative positions for connecting the motors with the generators for operation in a plurality of said relations, and electroresponsive latch mechanism connected to be rendered effective under the control of said exciter field control switch mechanism for preventing operation of said controller from the off position and from certain of said operative positions to other operative positions when said engine speed controlling device is operated from said low speed position.

In witness whereof, we have hereunto set our hands this 22nd day of March, 1926.

LEWIS W. WEBB.
BERNARD WOODWARD.